Sept. 19, 1933.    A. W. GRAY    1,927,401
COMPENSATOR FOR RECORDERS
Filed Oct. 25, 1930    2 Sheets-Sheet 1
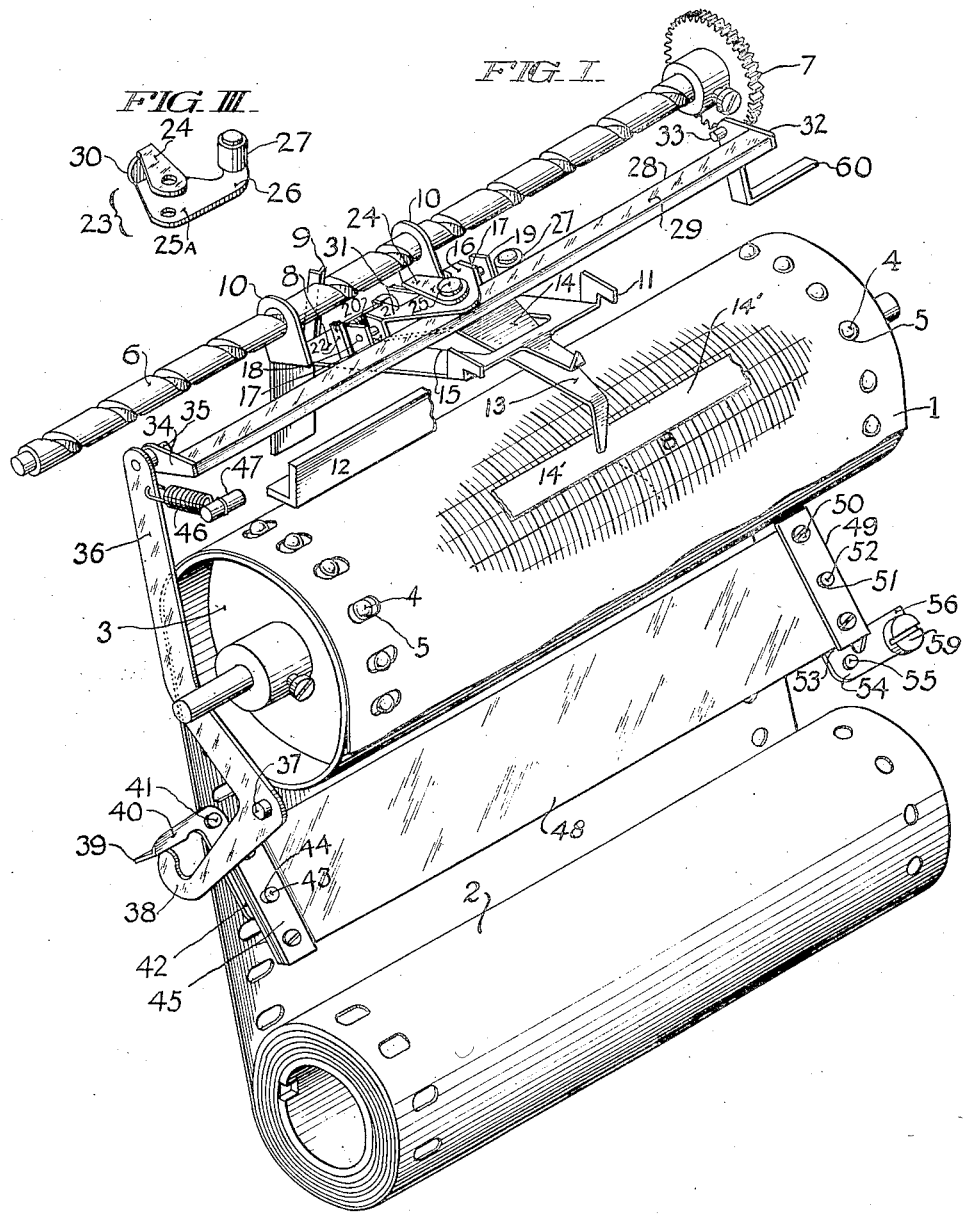
INVENTOR.
Arthur W. Gray,
BY Louis J. McBane
ATTORNEYS.

Sept. 19, 1933.  A. W. GRAY  1,927,401
COMPENSATOR FOR RECORDERS
Filed Oct. 25, 1930  2 Sheets-Sheet 2
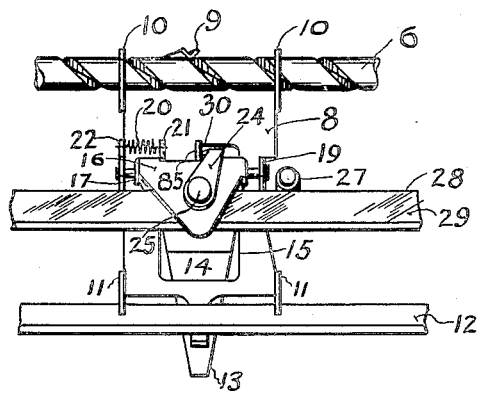
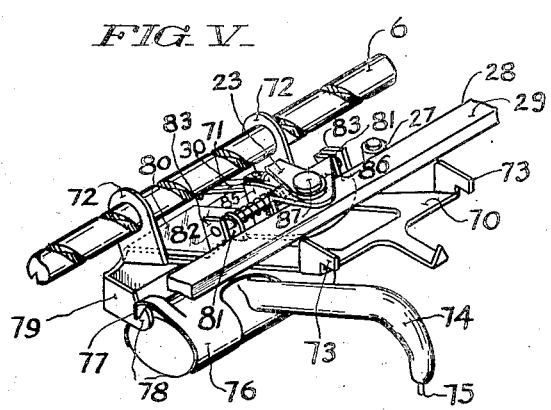
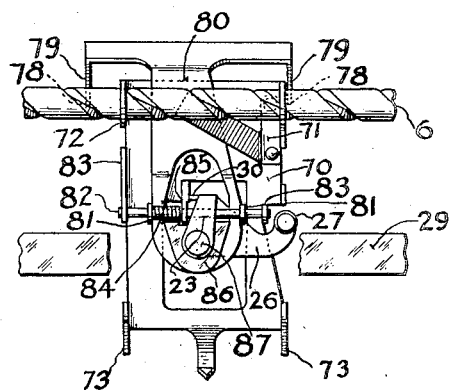
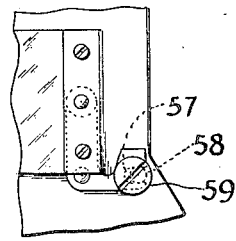
INVENTOR.
Arthur W. Gray,
BY Louis J. McBane
ATTORNEYS.

Patented Sept. 19, 1933

1,927,401

UNITED STATES PATENT OFFICE 1,927,401

COMPENSATOR FOR RECORDERS

Arthur W. Gray, Philadelphia, Pa., assignor to The Brown Instrument Company, Philadelphia, Pa., a corporation of Pennsylvania Application October 25, 1930. Serial No. 491,166

29 Claims. (Cl. 234—1)

This invention relates to measuring apparatus, and was primarily devised for use in recorders for measuring instruments, and especially recorders for potentiometers.

Recording devices in general make use of a chart for receiving the record, the material of which is usually a paper. Paper and other chart materials are subject to dimensional changes with variations in ambient conditions such as humidity and temperature. Other ambient conditions may affect the dimensions of the chart. Such changes in chart dimensions modify the scale of the chart so that a record made thereon is in error by an amount dependent upon the departure of ambient conditions from a normal condition and the effect which such a departure of ambient conditions has upon the paper. For measuring instruments particularly, such error is objectionable. In a prior copending application of Thomas R. Harrison, filed January 24, 1930, Serial No. 423,028, means are disclosed for effecting compensation in the operation of making the record which will result in a correct record despite dimensional variations of the chart due to changes in ambient conditions, and one object of the present invention is to provide improved means for effecting such compensation.

Measuring instruments may be operated either to make a record of one measured quantity, or may be operated to make a record of a plurality of measured quantities on the same chart. Where a single record is made, the recording action may be a continuous one. Where a multiple record is made, it is desirable that the recording action be intermittent. It is another object of this invention to provide a device for compensating the record for dimensional changes in the chart and be adaptable for either continuous or intermittent recording.

In pyrometric measurements employing thermocouples as the temperature responsive element, the variation in the electro-motive force generated by the thermocouple with variations in temperature is not a relation of exact proportionality. Similarly in making other measurements it frequently is the case that the quantity ultimately measured does not produce in the measuring instrument a strictly proportional action. Where in the case of the pyrometer, an electromotive force acts upon a galvanometer to produce a deflection proportional to the electromotive force generated by the thermocouple, the galvanometer deflection departs slightly from a directly proportional relation with respect to the temperature being measured, yet it is desirable in temperature measurements, as well as in other measurements, to provide an equally graduated chart in terms of the ultimate quantity measured. Accordingly it is an object of this invention to provide means for modifying the measuring action of an instrument so as to produce a recording action which is directly proportional to the quantity measured, thereby making possible the use of an evenly graduated chart. It is also an object of this invention to provide such a means for compensating the instrument operation to produce a record upon an evenly graduated chart in combination with a construction operating to compensate the record for dimensional changes in the chart and/or a construction operating to make either a continuous or an intermittent record.

From time to time when it is necessary to change a chart in an instrument, a slight dissimilarity in the previous and succeeding charts may make necessary a readjustment of the zero or normal point of the instrument so as to bring the marking device and the chart in correct recording relation. It is also an object of this invention to provide improved means for such an adjustment.

Other objects and advantages of the present invention appear in the following detailed description in connection with the accompanying drawings, in which Fig. 1 is a view in perspective of one embodiment of the essential parts of my invention in assembled relation.

Fig. 2 is a plan view of a detailed part of this invention.

Fig. 3 is a perspective view of a detail.

Fig. 4 is a plan view broken away, of a detail.

Fig. 5 is a view in perspective showing a detail of a modified form of my invention.

Fig. 6 is a plan view of the device of Fig. 5 with certain parts omitted.

In recording devices in general, the record receiving element broadly termed a chart herein, may take many forms such as a strip fed from a roll, or a flat circular sheet, or a card for example; and the material of which a chart is made may be any adapted for receiving a record and adapted for use with the device for producing the record. In the particular illustration of the invention herein disclosed a strip chart is shown. The strip chart 1 is fed from the roll 2 rotatably supported in any convenient manner in the frame of the recorder. In a recording device making use of strip charts, the chart conveniently may be fed by a roller 3 provided with suitable means for engaging the chart such as studs 4 on the surface of the roller which fit into apertures 5. One row of the apertures 5 may be formed as slots to allow expansion and contraction of the paper relative to the surface of the roller. The roller is driven by any suitable well known means at a rate of speed, either constant or variable, adapted to the making of the record.

From the broad aspects of the invention the recording mechanism and the manner of making the record may be any of a large variety of well known devices operating in well known ways. In the specific illustration embodying the principles of this invention, parts of an instrument of the potentiometer type are made use of. A spirally grooved shaft 6 may be conveniently driven through a gear 7 by well known potentiometer driving mechanism so that the rotations of the spiral shaft 7 are in accordance with the variations in the quantity measured. Obviously, the shaft 6 which is mounted for rotation in the frame of the recording device, may be driven in rotation in response to any of a large variety of measured quantities and by any of a large variety of measuring devices.

The spiral shaft 6 operates to position a carriage 8. The position of the carriage 8 is determined by the extent of the rotation of the shaft 6, and accordingly its position is a measure of the quantity to which the recording device responds. The carriage 8 has secured thereto in any suitable manner, as by rivets, the cam follower 9 which is shaped and positioned to ride in the spiral groove of the shaft 6. The carriage 8 is provided with ears 10 integral therewith, in which shaft 6 rotates and which supports the carriage for sliding movement on the shaft 6. The carriage 8 is provided with lugs 11 integral therewith, which rest upon a frame member 12, and are slidable thereon. The lugs 11 and ears 10 support the carriage 8 for sliding movement which, as shown in Fig. 1, is in a direction parallel to the axis of rotation of the roller 3 and therefore transverse to the direction of movement of the chart 1.

A marking device is supported by the carriage 8. The marking device is a print hammer 13 which is operated to make a record upon the chart 1 by pressing, at a point, the ribbon 14¹ of carbon paper or inked cloth or other material capable of producing a record against the surface of the chart 1. The print hammer 13 is an integral part of a tongue 14 which extends through a slot 15 formed in the carriage 8. The sheet metal tongue 14 is bent upon itself to form a top plate 16 and is further bent upon itself to form a pair of lugs 17. The lugs 17 are apertured to receive a shaft 18 which is pinned in projections 19 bent up from the carriage 8, thus the print hammer 13 is pivoted for oscillation about the shaft 18 through the tongue 14 and integral parts. The print hammer 13 and associated parts are also longitudinally slidable on a shaft 18. A spring 20 secured to lugs 21 and 22 integral with the tongue 14 and with the carriage 8 respectively, tends to urge the print hammer and associated parts to the left, as shown in Fig. 2.

A yoke 23 (see Fig. 3) is arranged to fit over the sheet metal tongue 14 carrying the print hammer 13, the upper arm 24 of the yoke being pivoted to the top plate 16 by pin 25. The lower arm 25A of the yoke is similarly pivoted on the bottom of the face of the tongue 14, thereby supporting the yoke 23 for oscillation on the sheet metal member carrying the print hammer 13. The yoke 23 has an arm 26 carrying a roller 27 which rides on the surface 28 of cam or bar 29. The bridge 30 joining the arms 24 and 25A, is, as shown in Figures 1 and 2, adapted to press against a projection 31 struck up from carriage 8.

As shown in Fig. 2, the spring 20 tends to urge the sheet metal member carrying print hammer to the left thereby forcing the bridge 30 of the yoke 23 against projection 31 on carriage 8, which tends to cause the yoke 23 to rotate in a clockwise direction thereby forcing the roller 27 against the surface 28 of the cam or bar 29. The position which the print hammer carrying member takes up longitudinally of the shaft 18, is determined by the position of the surface 28 of the cam or bar 29. By making the surface 28 an appropriate contour, the movement of the carriage 8 as transmitted to the print hammer, may be modified to compensate for the deviation of the measured quantity from strict proportionality, thereby making possible the use of an evenly graduated chart. The action of the cam surface 28 would be to cause the roller 27 to move in a direction toward and away from the shaft 18 as the carriage 8 is moved transversely of the chart by the action of the spirally grooved shaft 6, which motion of the roller 27 transmitted through the yoke 23 would cause a shifting of the print hammer 13 relative to the carriage 8 in a direction transverse to that of the motion of the chart. This action of the cam or bar 29 which makes possible the use of an evenly graduated chart, may be effected independently of the other features of this invention if so desired, although it is preferred to combine that feature with others of this invention.

The cam or bar 29 is supported at one end by a bell crank 32 loosely pivoted upon a pin 33 carried by the frame. The bell crank 32 is pivoted loosely on the pin 33 so that it may be oscillated about the pin 33 as an axle, and also so the frame of the bell crank 32 may be tilted slightly relative to the axle. At its other end the cam or bar 29 is supported by an arm 34 pivoted loosely upon pin 35 fixed in an extremity of the bell crank lever 36. Bell crank lever 36 is at its elbow pivoted on pin 37 carried by the frame. The other arm 38 of the bell crank lever 36 rests against the surface of plate 39 carried by one arm of a bell crank lever 40 pivoted by pin 41 fixed in the frame of the machine. The other arm 42 of the bell crank lever 40 carries pin 43 extending through and rotatable in apertures 44 in a pair of plates 45. The arm 38 of the bell crank lever 36 is urged against the plate 39 by a spring 46 joined to the bell crank lever 36 and a pin 47 fixed to the frame.

Secured by a clamping action between the plates 45, is one end of a strip or sheet 48 of a material responsive by dimensional changes to variations in ambient conditions such as humidity and temperature which would effect dimensional changes in the chart. While the material of the strip or sheet 48 may be any of a large variety of materials which are caused to change in dimension by changes in humidity and temperature, it is preferred to employ a specimen of the material of which the chart is made, which has the advantage that changes in the dimensions of the chart will be followed in approximately exact correspondence by changes in dimension in the specimen 48 of the chart material as ambient conditions change. The other extremity of the specimen or strip of material 48 is secured between a second pair of plates 49. The pairs of plates 45 and 49 can be fastened together in any suitable manner as in screws 50. The pair of plates 49 is provided with aperture 51 in which pin 52 is rotatable. Pin 52 is carried on arm 53 of bell crank lever 54 pivoted on pin 55 secured to the frame. The other arm 56 of the bell crank lever 54 is provided with a slot 57 in which rides eccentric pin 58 carried by eccentric 59, the eccentric 59 being rotatable in the frame, as shown in Fig. 4.

The chart 1 being drawn from a supply roll 2, spaced at a distance therefrom such that with the proper speed of rotation of the roller 3, a considerable length of time, such for example as several hours, will elapse between the time that a particular portion of the chart 1 leaves the roller 2 and comes underneath the print hammer 13. By providing for such a length of time of exposure of the chart to ambient conditions, the material of the chart takes up or assumes a condition which is determined by the ambient conditions then prevailing. The condition of the material of the strip or specimen 48 corresponds to that of the chart in the vicinity of the print hammer 13 since the strip or specimen 48 is continually exposed to ambient conditions.

Changes in ambient conditions, such as changes of humidity and/or temperature, cause the specimen 48 to elongate or contract accordingly. The expansion and contraction of the specimen or strip 48 causes movement of the plates 45 and a corresponding movement of the pin 43 which causes a rotation of the bell crank 40 about the pin 41. The movement of the bell crank 40 is transmitted by the contact between the arm 38 and the plate 39 to the bell crank lever 36. Movement of the bell crank lever 36 causes movement of the cam or bar 29 in a direction toward or away from the shaft 18. Such movement of the cam or bar 29 acts through roller 27 and yoke 23, resting against the projection 31, to shift the sheet metal member carrying the print hammer 13 in a direction transverse to the direction of movement of the chart; thus for every expansion or contraction of the material of the chart due to changes in the ambient conditions, there is a corresponding shift of the position of the print hammer 13 effected through the action of the strip or specimen 48 so that the record made upon the chart 1 by the print hammer 13 will occupy the proper position relative to the scale on the chart.

The pivotal connection between bell crank 32 and pin 33 lies approximately in the plane of the projections 5 at the right hand end of roller 3. Consequently the extent of lateral displacement of cam or bar 29 increases progressively from the right end to the left end as viewed in Fig. 1 for a given change in length of member 48. Accordingly, the extent of compensating adjustment of the print hammer 13 increases progressively according to its position measured from right to left. The error due to expansion of the chart increases progressively in the same direction since the right side of the chart is held against expansion while the left side moves freely. Therefore the compensation is effective to the proper degree throughout the width of the chart.

Obviously the construction and material of the specimen 48 might be other than that preferred, and obviously the motion transmitting mechanism for effecting a shift of the print hammer 13 relative to the chart 1, may be varied widely without departing from the principles of the invention. Instead of shifting print hammer relative to the chart, it is possible and may be desirable to shift the chart relative to the print hammer, all within the scope of this invention in its broadest aspects.

It is frequently necessary to adjust the zero point, especially when changing charts. A convenient device for effecting that adjustment consists in the eccentric 59 which, when rotated, shifts the bell crank 54 about the pin 55, thereby bodily shifting the specimen 48 causing a corresponding movement of the cam or bar 29, thereby shifting the print hammer carrying member relative to the carriage 8, in a direction transverse to the direction of motion of a chart. The eccentric may be manipulated manually over a limited range until the print hammer is brought into proper correspondence with the chart scale. Obviously the device for effecting the adjustment of the zero point may be arranged otherwise and associated differently with the other features of this invention. For example, the end of the cam or bar 29 carried by the bell crank 32 might be operated by a suitable manually adjustable device to effect the zero adjustment; or the zero adjustor might be positioned anywhere in the linkage connecting the strip 48 with the cam or bar 29; or the zero adjustor might be mounted upon the carriage. The preferred form of construction and arrangement of the zero adjustor is shown in Fig. 1 and described in detail hereinabove.

As before pointed out, the bell crank 32 may be oscillated about the pin 33 and an extension 60 on the bell crank 32 is provided which may be engaged by an operating part of the recording device or instrument to oscillate the bell crank 32. Oscillation of the bell crank 32 about the pin 33 as an axle, causes the cam or bar 29 to oscillate about the pins 33 and 35 as axles. The oscillation of the cam or bar 29 rotates the print hammer carrying member about the shaft 18, to force the print hammer against the ribbon $14^1$ and against the chart 1, thereby making a record. Obviously other means may be employed for depressing the print hammer 13 to make a record on chart 1. That shown in Fig. 1 and described hereinabove, is the preferred form.

As will be obvious from the above description, the construction and arrangement of parts whereby the temperature of the measured quantity from a strictly proportional law is compensated for to make the use of an evenly graduated chart possible, may be effected independently of the other features of this invention. Likewise, the operation of the compensator to shift the print hammer relative to the chart 1 so as to compensate for the change in dimension of the chart that changes in ambient conditions cause, may be practised independently of the other features of this invention. Also, the method and means of effecting a zero adjustment may be practised independently of the other features of this invention. And also, the method and means of depressing the print hammer 13 may be practised independently of the other features of this invention. However, it has been found desirable and it is preferred to combine the various features of the invention into a cooperating system whereby the means for effecting the features of this invention are inter-related and coact.

Obviously one or more of the features of the invention may be omitted while the other features are retained in combination.

The modification of the invention disclosed in Figures 1 and 2 relate to that type of recording device in which the record is made intermittently while that modification of the invention shown in Figures 5 and 6 relate to that type of recording device which makes a continuous record.

In Figures 5 and 6, the spirally grooved shaft 6 drives the carriage 70 through the coaction of the finger 71 with the spiral groove of the shaft 6, the finger 71 being fixed by riveting or otherwise on the carriage 70. Carriage 70 is supported by ears 72 having apertures through which the shaft 6 passes and by lugs 73 which slidably rest upon a frame member 12, (not shown in Figures 5 and 6). The record marking device takes the form of an ink well 74 having a capillary 75 adapted to rest upon the surface of the chart to make a continuous record. The ink well 74 is carried by sheet metal clip 76 provided with tongues 77 resting in notches 78 in arms 79 of the marker support 80 which is adjustably supported in the carriage 70. The marker support 80 has up-turned lugs 81 through which shaft 82 freely passes. Shaft 82 is fixed at its extremities in lugs 83 turned up from carriage 70. A spring 84 coiled about shaft 82 abuts against one lug 81 and against a finger 85 up-turned from carriage 70. The thrust spring 84 acts to thrust the marker support 80 to the left as shown in Fig. 6.

The marker support 80 has a portion 86 struck up therefrom and bent over into parallel relation with respect to the body of the member 80, thereby providing a slot between the bent over portion of the member 86 and the body of the member 80 in which the cam or bar 29 fits, as shown in Fig. 5. A yoke 23 (see Fig. 3) is fitted over the up-turned portion 86 and the opposite part of the body of the member 80 and pivoted thereon by pins 87 so that the yoke is free to rotate upon the marker support 80. The bridge 30 of the yoke 23 rests against the finger 85 struck up from the carriage 70. The roller 27 carried by the arm 26 of the yoke 23, rests against the surface 28 of the cam or bar 29. The roller 27 acting against the surface 28 and through the yoke 23 against the finger 85, resists the pressure of the spring 84, tending to thrust the marker support 80 to the left so that the position of the roller 27 as determined by the position of the surface 28 of the cam or bar 29, determines the position of the ink well 74 relative to the carriage 70. The other features of the invention associated with the marking device of Figures 1 and 2, are applicable to that modification of the invention as shown in Figures 5 and 6, the mode of operation of the device being the same except that the mechanism for and operation of effecting a record marking motion of the print hammer is unnecessary in the modification shown in Figures 5 and 6.

This invention has been described with reference to both a continuous and an intermittent type of recorder and those features applicable to both types are my invention. However, the invention exemplified by the operation of the bar to effect the printing operation and the combination of the features of my invention therewith, I do not claim as my invention.

While examples of the invention have been described specifically by way of illustration of the principles of the invention, it is not intended so to limit the invention inasmuch as many variations in the details of construction and arrangement of the parts and mode of operation thereof, may be made, as will be apparent to one skilled in the art, without departing from the spirit and scope of this invention.

Having now described my invention, what I claim is:

1. In combination, a record making device, a chart arranged to receive the record, and auxiliary means variable in response to changes in ambient conditions for adjusting the device relative to the chart so as to compensate for dimensional changes in the chart resulting from said changes in ambient conditions.

2. In combination, a record making device, a chart receiving the record, means including a specimen of the chart material responsive to variations in ambient conditions for adjusting the device relative to the chart to compensate the record for dimensional variations in the chart resulting from said variations in ambient conditions.

3. In combination, a record making device, a chart arranged to receive the record, means variable in response to changes in ambient conditions for adjusting the device relative to the chart so as to compensate for dimensional changes in the chart resulting from said changes in ambient conditions, and means for adjusting the first mentioned means to set the device and the chart relatively in correct recording relation.

4. In combination, a marking device, a carriage adjustably supporting the marking device, a chart arranged to receive a record made by said marking device, said carriage and chart being relatively movable according to variations in the quantity being recorded, means responsive to variations in ambient conditions which affect chart dimensions for adjusting the marking device in the carriage to compensate the record for changes in chart dimensions.

5. In combination, a marking device, a carriage adjustably supporting the marking device, a chart arranged to receive a record made by said marking device, said carriage and chart being relatively movable according to variations in the quantity being recorded, means responsive to variations in ambient conditions which affect chart dimensions for adjusting the marking device relative to the carriage to compensate the record for changes in chart dimensions, and means for adjusting the first mentioned means to set the marking device in correct recording relation with the chart.

6. In combination, a marking device, a carriage adjustably supporting the marking device, a chart arranged to receive a record made by said marking device, said carriage and chart being relatively movable according to variations in the quantity being recorded, means including a specimen of the chart material responsive to variations in ambient conditions which affect chart dimensions for adjusting the marking device in the carriage to compensate the record for changes in chart dimensions.

7. In combination, a marking device, a carriage adjustably supporting the marking device, a chart arranged to receive a record made by said marking device, said carriage and chart being relatively movable according to variations in the quantity being recorded, means including a specimen of the chart material responsive to variations in ambient conditions which affect chart dimensions for adjusting the marking device to compensate the record for changes in chart dimensions, and means for adjusting the first mentioned means to set the marking device in correct recording relation with the chart.

8. In combination, a record making device, a movable chart for receiving the record, a specimen of the chart material arranged to be subjected to ambient conditions affecting chart dimensions, means operated by the specimen for adjusting the device relative to the chart transversely of the direction of chart movement to compensate the record for dimensional changes in the chart, and means operating on the specimen for setting the device and the chart relatively in correct recording relation.

9. In combination, a marking device, a carriage adjustably supporting the marking device, a movable chart for receiving the record, a specimen of the chart material arranged to be subjected to ambient conditions affecting chart dimensions, means operated by dimensional changes in the specimen for adjusting the marking device in the carriage transversely of the direction of movement of the chart to compensate the record for dimensional changes in the chart.

10. In combination, a marking device, a carriage adjustably supporting the marking device, a movable chart for receiving the record, a specimen of the chart material arranged to be subjected to ambient conditions affecting chart dimensions, means operated by dimensional changes in the specimen for adjusting the marking device transversely of the direction of movement of the chart to compensate the record for dimensional changes in the chart, and means operating on the specimen for setting the device and the chart relatively in correct recording relation.

11. A recording system for potentiometers comprising, means operating in accordance with measurements of the potentiometer, a carriage positioned by said means, a marking device adjustably supported by said carriage, a chart arranged to receive the record of and movable relative to said marking device, a specimen of the chart material arranged to be subjected to ambient conditions affecting chart dimensions, means operated by dimensional changes in the specimen for adjusting the marking device transversely of the direction of chart movement to compensate the record for dimensional variations in the chart, and means operating on the specimen for setting the device and the chart relatively in correct recording relation.

12. In combination, a record making device, a chart for receiving the record, means responsive to ambient conditions for adjusting the device relative to the chart to compensate the record for dimensional changes in the chart caused by said ambient conditions, and means associated with the first mentioned means for modifying the law of operation of said device.

13. In combination, a record making device, a chart for receiving the record, means operating in accord with dimensional changes in chart material to compensate the record for dimensional changes in the chart, and means associated with the first mentioned means for modifying the law of operation of the device.

14. A recording system for potentiometers comprising, means operating in accordance with measurements of the potentiometer, a carriage positioned by said means, a marking device adjustably supported by said carriage, a chart arranged to receive the record of and movable relative to said marking device, a specimen of the chart material subjected to ambient conditions affecting the chart dimensionally, a cam cooperating with said marking device, means connecting said specimen and cam whereby dimensional variations of the specimen adjust the marking device transversely of the direction of movement of the chart to compensate the record for dimensional variations in the chart.

15. A recording system for potentiometers comprising, means operating in accordance with measurements of the potentiometer, a carriage positioned by said means, a marking device adjustably supported by said carriage, a chart arranged to receive the record of and movable relative to said marking device, a specimen of the chart material subjected to ambient conditions affecting the chart dimensionally, a cam cooperating with said marking device, means connecting said specimen and cam whereby dimensional variations of the specimen adjust the marking device transversely of the direction of movement of the chart to compensate the record for dimensional variations in the chart, said cam having means cooperating with the marking device to modify the law of operation thereof.

16. A recording system for potentiometers comprising, means operating in accordance with measurements of the potentiometer, a carriage positioned by said means, a marking device adjustably supported by said carriage, a chart arranged to receive the record of and movable relative to said marking device, a specimen of the chart material subjected to ambient conditions affecting the chart dimensionally, a cam cooperating with said marking device, means connecting said specimen and cam whereby dimensional variations of the specimen adjust the marking device transversely of the direction of movement of the chart to compensate the record for dimensional variations in the chart, said cam having means cooperating with the marking device to modify the law of operation thereof, and means associated with said specimen for adjusting the marking device and the chart relatively in correct recording relation.

17. In combination, a record marking device, a carriage adjustably supporting said device, a movable chart arranged to receive the record, and means for adjusting said device on said carriage transversely of the direction of movement of said chart to compensate for dimensional variations in said chart and to provide a correct recording relation between said device and chart comprising a cam member cooperating with said device, means operable by said cam member for varying the position of said device relative to said carriage, and means for moving said cam member to provide the compensating effect.

18. In combination, a movable record making device, a carriage adjustably supporting said device, a chart arranged to receive the record, said carriage being movable in accordance with a predetermined law of operation, and means dependent on the movement of the carriage for adjusting said device in said carriage during certain portions of its movement, to vary the law of operation of said device.

19. In combination a record making device, movable in accordance with a predetermined law of operation, a carriage adjustably supporting said device, a movable chart arranged to receive the record, and means for adjusting said device in said carriage transversely of the direction of movement of said chart to vary the law of operation of said device comprising a member associated with said device and having a cam surface formed with a contour proportioned in accordance with the deviations of the device movements from a straight-line law, and means engaging said cam surface for varying the position of said device relative to said carriage.

20. In measuring apparatus, the combination with a member having movement along a path in acordance with changes in a quantity measured, of a device connected to said member for adjustment relative to said member longitudinally of said path, and an element extending along said path which engages said device and controls said adjustment and thereby controls the movement of the device relative to the movement of said member along said path as said movements proceed.

21. In measuring apparatus, the combination with a member having movement along a path in accordance with changes in a quantity measured, of a device connected to said member for adjustment relative to said member longitudinally of said path, and an element extending along said path which engages said device and controls said adjustment and thereby controls the movement of the device relative to the movement of said member along said path as said movements proceed, said element having a device engaging surface cam shaped to produce predetermined variations in said adjustment as said member moves along said path.

22. In measuring apparatus, the combination with a member having movement along a path in accordance with changes in a quantity measured, of a device connected to said member for adjustment relative to said member longitudinally of said path, an element extending along said path which engages said device and controls said adjustment and thereby controls the movement of the device relative to the movement of said member along said path as said movements proceed, and means adjusting said element to thereby adjust the zero position of said device.

23. In measuring apparatus, the combination with a member having movement along a path in accordance with changes in a quantity measured, of a device connected to said member for adjustment relative to said member longitudinally of said path, and an element extending along said path which engages said device and controls said adjustment and thereby controls the movement of the device relative to the movement of said member along said path as said movements proceed, said element being adjustable into different positions relative to said path to thereby vary the said adjustment of said device progressively as said member moves from one end to the other of its path of movement at a rate dependent on the particular position into which said member is adjusted.

24. In measuring apparatus, the combination with a member having movement along a path in accordance with changes in a quantity measured, of a device connected to said member for adjustment relative to said member longitudinally of said path and an element extending along said path which engages said device and controls said adjustment and thereby controls the movement of the device relative to the movement of said member along said path as said movements proceed, said element being adjustable into different positions relative to said path to thereby vary the said adjustment of said device progressively as said member moves from one end to the other of its path of movement at a rate dependent on the particular position into which said member is adjusted, and means for so adjusting said element in response to changes in ambient conditions.

25. In measuring apparatus, the combination with a member having movement along a path in accordance with changes in a quantity measured, of a device connected to said member for adjustment relative to said member longitudinally of said path and an element extending along said path which engages said device and controls said adjustment and thereby controls the movement of the device relative to the movement of said member along said path as said movements proceed, said element being adjustable into different positions relative to said path to thereby vary the said adjustment of said device progressively as said member moves from one end to the other of its path of movement at a rate dependent on the particular position into which said member is adjusted, and means for so adjusting said element in response to changes in ambient conditions comprising a power transmitting linkage including a member which expands and contracts as said changes occur.

26. In measuring apparatus, the combination with a member having movement along a path in accordance with changes in a quantity measured, of a device connected to said member for adjustment relative to said member longitudinally of said path and an element extending along said path which engages said device and controls said adjustment and thereby controls the movement of the device relative to the movement of said member along said path as said movements proceed, said element being adjustable into different positions relative to said path to thereby vary the said adjustment of said device progressively as said member moves from one end to the other of its path of movement at a rate dependent on the particular position into which said member is adjusted, means for so adjusting said element in response to changes in ambient conditions comprising a power transmitting linkage including a member which expands and contracts as said changes occur, and means for adjusting said linkage to vary the zero position of said device.

27. In measuring apparatus, the combination with a member having movement along a path in accordance with changes in a quantity measured, of a device connected to said member for adjustment relative to said member longitudinally of said path, an element extending along said path which engages said device and controls said adjustment and thereby controls the movement of the device relative to the movement of said member along said path as said movements proceed, said element having a device engaging surface cam shaped to produce predetermined variations in said adjustment as said member moves along said path and being adjustable into different positions relative to said path to thereby vary the said adjustment of said device progressively as said member moves from one end to the other of its path of movement at a rate dependent on the particular position into which said member is adjusted, means for so adjusting said element in response to changes in ambient conditions, said means comprising a power transmitting linkage including a member expanding and contracting as said changes occur, and means for adjusting said linkage to vary the zero position of said device.

28. In measuring apparatus, the combination with a member having movement along a path in accordance with changes in the quantity measured, of a device mounted on said member for movement relative to the latter in the direction of the path, a lever connecting said member and device for effecting such relative movement when the lever is turned, and an element having a lever engaging and turning surface extending along said path and being angularly adjustable about an axis adjacent one end of said path to move said surface toward and away from the latter.

29. In measuring apparatus, the combination with a member having movement along a path in accordance with changes in the quantity measured, of a device mounted on said member for movement relative to the latter in the direction of the path, resilient means tending to produce such relative movement in one direction, a lever connecting said member and device for effecting such relative movement in the opposite direction when said lever is turned in one direction, and an element having a lever engaging and turning surface extending along said path and being angularly adjustable about an axis adjacent one end of said path to move said surface toward and away from the latter.

ARTHUR W. GRAY.